United States Patent [19]

Hiraguri

[11] 4,412,259

[45] Oct. 25, 1983

[54] MAGNETIC RECORDING AND/OR REPRODUCING APPARATUS HAVING A ROTARY HEAD TRACKING CONTROL DEVICE

[75] Inventor: Seisuke Hiraguri, Yokohama, Japan

[73] Assignee: Victor Company of Japan, Ltd., Kanagawa, Japan

[21] Appl. No.: 234,791

[22] Filed: Feb. 17, 1981

[30] Foreign Application Priority Data

Feb. 18, 1980 [JP] Japan ............................... 55-18824

[51] Int. Cl.³ .................... G11B 21/10; G11B 5/52
[52] U.S. Cl. .................................... 360/77; 360/84
[58] Field of Search ............... 360/77, 78, 75, 70, 360/84–85, 104–105, 107

[56] References Cited

U.S. PATENT DOCUMENTS

| | | | |
|---|---|---|---|
| 4,172,265 | 10/1979 | Sakamoto et al. | 360/77 |
| 4,186,480 | 2/1980 | Kriegelstein et al. | 360/84 |
| 4,296,443 | 10/1981 | Sakamoto et al. | 360/77 |
| 4,306,261 | 12/1980 | Bergmans et al. | 360/77 |

FOREIGN PATENT DOCUMENTS 2552784  8/1976  Fed. Rep. of Germany.
55-125532  9/1980  Japan .................................... 360/77

Primary Examiner—Alfred H. Eddleman
Attorney, Agent, or Firm—Posnack, Roberts, Cohen & Spiecens

[57] ABSTRACT

A magnetic recording and/or reproducing apparatus has a tracking control device for performing tracking control by varying the height position of a rotary head which rotates to record and/or reproduce signals in an oblique track on a magnetic tape, according to a control signal applied to the tracking control device. The magnetic recording and/or reproducing apparatus comprises a detecting device for detecting the height position of the rotary head at a predetermined position within an angular range of the rotary head, where the rotary head does not make contact with the magnetic tape, and a control signal forming circuit for forming a control signal according to the output of the detecting device and supplying the control signal to the tracking control device to control the height position of the rotary head so that the height position becomes constant.

9 Claims, 14 Drawing Figures

MAGNETIC RECORDING AND/OR REPRODUCING APPARATUS HAVING A ROTARY HEAD TRACKING CONTROL DEVICE

BACKGROUND OF THE INVENTION

1. Field of the Invention

The present invention relates generally to magnetic recording and/or reproducing apparatuses having a rotary head tracking control device, and more particularly to a magnetic recording and/or reproducing apparatus having a device for performing tracking control of the rotary head so that the rotary head accurately follows and traces the skews in the track on the magnetic tape upon reproduction, in which the height position of the rotary head is always controlled to be constant upon recording.

2. Prior Art

In recent years, in magnetic recording and/or reproducing apparatuses such as video tape recorders (VTR) of the helical scan type for home use, there has been a trend toward even higher densities of recording and reproducing, aided by improvements in magnetic tapes. For example, by reducing the tape speed and track pitch to approximately ⅓, for example, of their values as compared to the case of the conventional recording and/or reproducing capacity of 2 hours, recording and reproducing of 6 hours can be carried out. Susch long-duration recording and/or reproducing techniques are being reduced to practice. However, in the VTR for home use, in which the tape travel system is simplified in order to lower the cost, it is difficult to reproduce a magnetic tape having a reduced track pitch as mentioned above while positively maintaining the required tracking precision.

Furthermore, in a magnetic recording/reproducing apparatus capable of recording/reproducing for 2 hours, it is necessary to manipulate a tracking knob in order to cause the magnetic head to undergo accurate tracking along a track of the magnetic tape when interchanged reproduction is performed with another apparatus. That is, in the case where there are (1) differences in the position of the control head, (2) differences in the height of the video head, and (3) skews in the video track, between the recording and reproducing apparatuses, an optimum tracking state is not obtained, and hence maximum output cannot be obtained at the time of this interchanged reproduction.

For example, in the case where the distance L from the position where a video head which is mounted on the rotary drum begins to make contact with the magnetic tape to the position of the control head is longer than a standard value in the recorder, the tracking phase deviates. In this case, a control pulse is recorded by the control head at the lower edge of the magnetic tape. In a magnetic recording and/or reproducing apparatus capable of carrying out recording and reproducing of 6 hours, for example, the recording interval of the control pulse is 0.37 millimeters, which is approximately ⅓ of the 1.11 millimeters, obtained in the case of a conventional recording and reproducing of 2 hours.

In the case where the above mentioned distance L is not coincident with the standard value, it is necessary to adjust the tracking knob to delay the reproducing control signal by a required time to thereby carry out normal tracking. However, adjustment of the tracking knob requires an operation in which, as the reproduced picture is observed, the knob is finely adjusted in a manner such that noise is not generated, and this manipulation is complicated.

Furthermore, while the rotational control of the rotary drum and the rotating magnetic heads carried out by means of a drum servo-control by reproducing the above mentioned control pulses accomplishes a control function of a degree such as to maintain the relative positions of the corresponding positional relationship between each track and the rotating video heads, this rotational control, in the prior art, has not accomplished the function of a so-called tracking control.

Accordingly, a device for performing tracking control has been proposed in the U.S. patent application Ser. No. 178,852, for example, in which a new type of head moving mechanism for varying the height position of the rotary head is provided, and the head moving mechanism is controlled according to the tracking error of the rotary head, so that the rotary head finely follows and traces the track even when skews exist in the track on the magnetic tape. By using this proposed device, tracking control can be performed even upon reproduction modes in which the tape travelling speed is different from that upon recording, as in a slow-motion, fast-motion, and still reproduction modes, and a fine reproduced signal can be obtained having little noise accompanied by the tracking error.

Furthermore, the above proposed head moving mechanism is of a new construction in which the principle of a see-saw operation is employed, however, a head moving mechanism using bimorph has been used conventionally.

In a magnetic recording and/or reproducing apparatus provided with this type of a tracking control device, upon recording mode, it is necessary to maintain and support the rotary head at a predetermined constant height position in order to form tracks with a constant pitch and record signals. Accordingly, a constant voltage was conventionally applied to the head moving mechanism, to maintain the height position of the rotary head to be constant.

However, the rotary head is generally rotated at a high speed, of the order of 30 revolutions per second, and thus, the rotary head undergoes microscopic displacement even if a measure is taken to simply apply a constant voltage to the head moving mechanism. It is very difficult to constantly and accurately form tracks at a constant pitch, especially when the track pitch is small. Moreover, especially in a simplified magnetic recording and/or reproducing apparatus, it is difficult to provide a mechanism spearately to strongly lock the head moving mechanism so that the head moving mechanism does not move during the recording mode.

Therefore, in a magnetic recording and/or reproducing apparatus having the above described head moving mechanism, the realization to always maintain the height position of the rotary head to be constant in the recording mode, was highly desired.

Thus, another system has been proposed conventionally in which, reproduction is performed within a vertical blanking period of a video signal which is recorded on a magnetic tape, upon recording mode, throughout a period of 1.5 H (H designates one horizontal scanning period), for example, to indirectly detect the height position of the rotary head by detecting the cross-talk level from the adjacent tracks, and control the height position of the rotary head to be constant according to the detected information. However, in this proposed system, since reproduction is performed within the above period during the recording mode, drop-out of information is introduced in the recorded signal during the above period, and was disadvantageous in that interference is introduced in positively obtaining vertical synchronization.

SUMMARY OF THE INVENTION

Accordingly, a general object of the present invention is to provide a novel and useful magnetic recording and/or reproducing apparatus having a rotary head tracking control device, in which the above described problems have been overcome.

Another and more specific object of the present invention is to provide a magnetic recording and/or reproducing apparatus having a rotary head tracking control device, in which the height position of the rotary head is detected in the recording mode, and the height position of the rotary head is controlled so that the height is maintained constant by the rotary head tracking control device.

Still another object of the present invention is to provide a magnetic recording and/or reproducing apparatus in which the height position of a rotary head is controlled so as to be constant, by directly detecting the height position of the rotary head without recording and then reproducing the angular signal from a magnetic tape, at a position within a range where the rotary head does not make contact with the magnetic tape.

Other objects and further features of the present invention will be apparent from the following detailed description when read in conjunction with the accompanying drawings.

DETAILED DESCRIPTION

Figure 1:
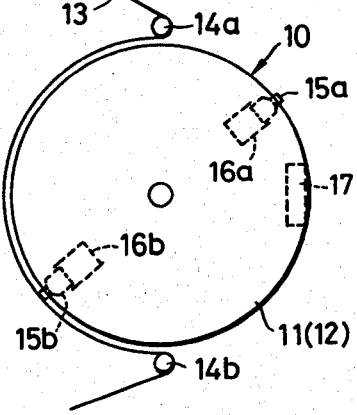
FIG. 1 is a plan view showing the positional relationship between a rotary head and a head height position detector.

In FIG. 1, a guide drum 10 comprises a rotary upper drum 11 and a fixed lower drum 12 provided below the rotary upper drum 11. A magnetic tape 13 is guided by guide pins 14a and 14b, and is obliquely wound around the guide drum 10 making contact in an angle range extending slightly over 180 degrees. Rotary heads 15a and 15b are respectively supported by head moving mechanisms 16a and 16b at respectively opposing positions along the diametral direction of the rotary upper drum 11. The rotary upper drum 11 is rotated at a rotational speed of 1800 r.p.m., for example, and a recording video signal is alternately recorded on the magnetic tape in an oblique track with respect to the logitudinal direction of the magnetic tape 13 by the rotary heads 15a and 15b.

A known flexible type bimorph in which two piezoelectric plates having mutually different flexion direction are adhered together through a conductive flexible plate, can be used as the head moving mechanisms 16a and 16b. In this case, one end of the bimorph is fixed, and the rotary head is mounted on the other free end of the bimorph. Due to the polarity and the voltage of the voltage applied to the bimorph, one of the piezoelectric plates expands and the other plate contracts, and the rotary head is accordingly displaced with respect to the direction of the track width.

A rotary head height position detector 17 is provided within the fixed lower drum 12, for example, and detects the height positions of the rotary heads 15a and 15b in the recording mode of the magnetic recording and/or reproducing apparatus. The detector 17 is provided at a predetermined position within the angular range in which the magnetic tape 13 does not make contact with the guide drum 10. Moreover, the detector 17 is not limited to being provided within the guide drum 10, and can be provided outside the guide drum 10. The detector 17 detects the height positions of the rotary heads 15a and 15b, every time the rotary heads 15a and 15b pass the corresponding position of the detector 17.

Figure 2:
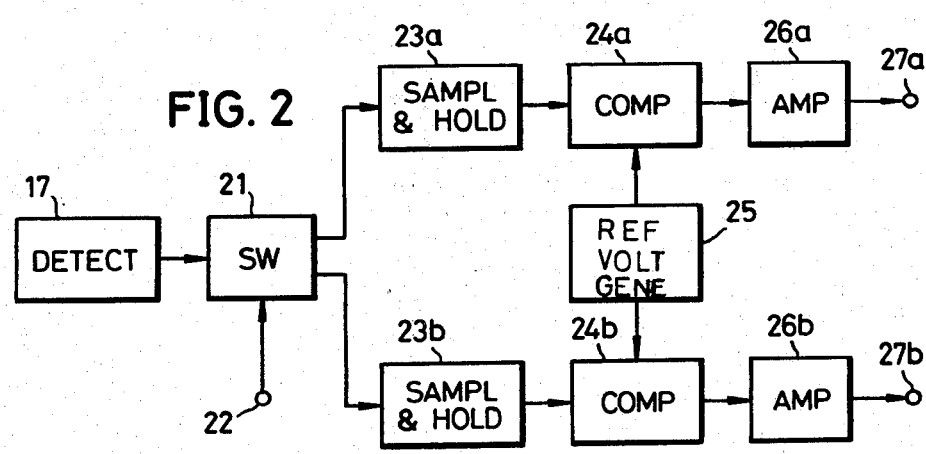
FIG. 2 is a systematic block diagram showing the essential parts of an embodiment of a magnetic recording and/or reproducing apparatus of the present invention.

A block system of the essential parts of a first embodiment of an apparatus according to the present invention, will now be described in conjunction with FIG. 2.

In the recording mode, an output detected signal of the rotary head height position detector 17 is supplied to a switching circuit 21, wherein the signal thus supplied is switched by a drum pulse from a terminal 22, where the drum pulse is generated according to the rotation of the rotary upper drum 11. Therefore, due to this switching circuit 21, the height position detected signal of the rotary head 15a and the height position detected signal of the rotary head 15b supplied from the detector 17, are respectively supplied to a sample-and-hold circuit 23a and a sample-and-hold circuit 23b. The sample-and-hold circuits 23a and 23b respectively sample the levels of the height position detected signal supplied thereto, and hold the signal for one rotation period (that is, 1/30th of a second) of each of the respective rotary heads.

The levels held by the sample-and-hold circuits 23a and 23b are respectively supplied to comparators 24a and 24b, wherein the levels thus supplied are respectively compared with a reference voltage level supplied from a reference voltage generator 25. The reference voltage generator 25 generates a voltage corresponding to the predetermined reference height position of the rotary heads 15a and 15b. Accordingly, compared error outputs which correspond to the error quantities in the height positions of the rotary heads 15a and 15b with respect to the reference height position, are respectively obtained from the comparators 24a and 24b. The output error signals of the comparators 24a and 24b are respectively obtained from output terminals 27a and 27b through amplifiers 26a and 26b, and are then respectively applied to the head moving mechanisms 16a and 16b as control signals.

The head moving mechanisms 16a and 16b respectively control the rotary heads 15a and 15b according to the control signals applied thereto, so that the height positions of the rotary heads 15a and 15b are always at a predetermined reference height position. Thus, the rotary heads 15a and 15b are respectively maintained at the predetermined reference height position, at least upon tracing of the magnetic tape 13, and therefore, a signal can always be recorded by forming a track at a constant pitch.

Figure 3:
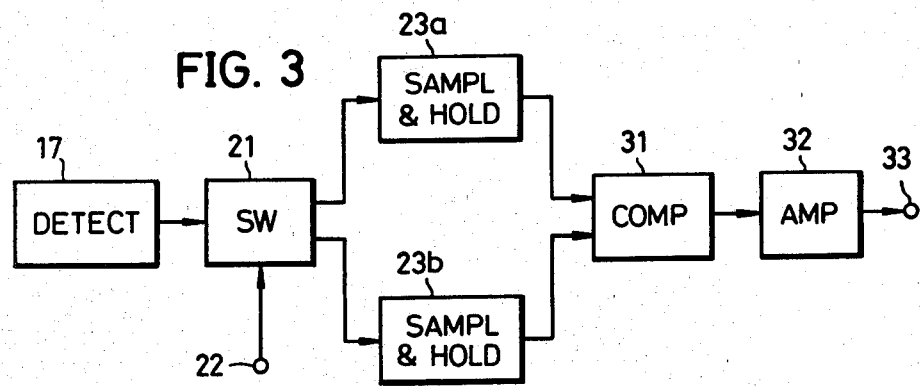
FIG. 3 is a systematic block diagram showing the essential parts of another embodiment of a magnetic recording and/or reproducing apparatus of the present invention.

Next, the block system of the essential parts of a second embodiment of an apparatus according to the present invention will be described in conjunction with FIG. 3. In FIG. 3, those parts which are the same as those corresponding parts in FIG. 2 will be designated by the like reference numerals, and their description will be omitted.

In the present embodiment of the invention, the outputs of the sample-and-hold circuits 23a and 23b are respectively supplied to a comparator 31, wherein the levels of the signals thus supplied are compared with each other. The compared error output of the comparator 31 is obtained from an output terminal 33 as a control signal, through an amplifier 32. Since the comparator 31 mutually compares the outputs of the sample-and-hold circuits 23a and 23b which correspond to the height positions of the respective rotary heads 15a and 15b, the output error signal of the comparator 31 is a signal which corresponds to the difference between the height positions of the rotary heads 15a and 15b. Hence, the present embodiment of the invention is suitable for use in a head moving mechanism in which the height positions of the rotary heads are controlled so that the output of the comparator 31 becomes zero, that is, so that the height positions of the rotary heads become equal. The circuit construction of the present embodiment of the invention is simple compared to that in the above first embodiment of the invention.

Figure 4A:
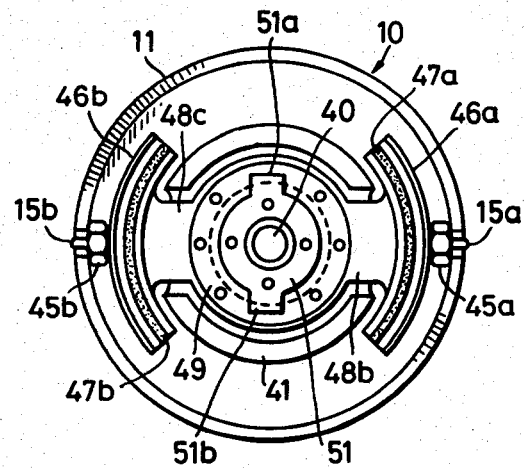
FIGS. 4A, 4B, and 4C respectively are a bottom view of a rotary drum, a cross-sectional view of a drum assembly, and a perspective view of the bottom surface of a swinging member, in an example of a head moving mechanism used in the magnetic recording and/or reproducing apparatus of the present invention.

An example of a head moving mechanism, especially applied with a control signal obtained from the block system shown in FIG. 3, and capable of controlling the height position of the heads, will now be described in conjunction with FIGS. 4A through 4C. This mechanism is described in detail in the above described U.S. patent application Ser. No. 178,852.

The rotary upper drum 11 is fixed at the tip end portion of a rotary shaft 40 which is rotatably supported and extends through the central part of the fixed lower drum 12. The rotary upper drum 11 is rotated, for example, at a predetermined rotational speed of 1800 rpm, due to the rotation of the rotary shaft 40 by the rotation of a drum motor (not shown).

Figure 4B:
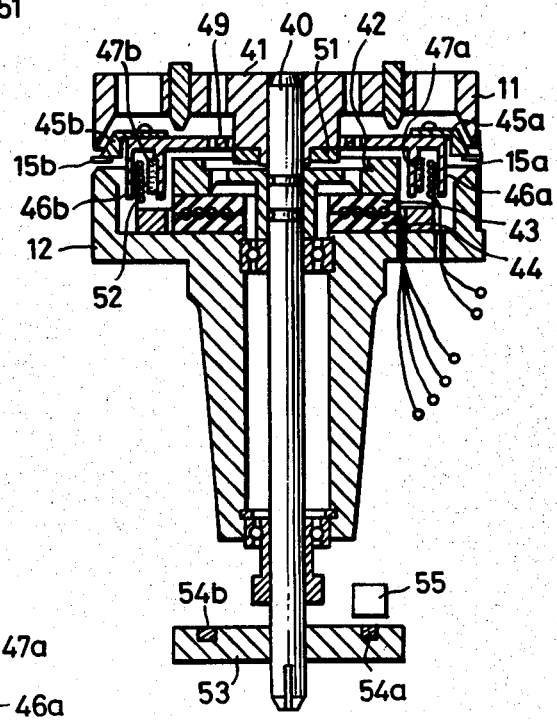
Figure 4C:
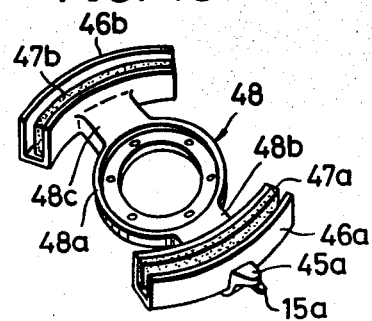

A projection part of a bushing 41 is integrally fixed to the central part of the rotary upper drum 11, as shown in FIG. 4B. Furthermore, the rotary shaft 40 extends coaxially at the central part of the bushing 41. A fly-wheel 42 is unitarily rotated with the rotary shaft 40, and fixed to a rotary coil mounting part 43 of a rotary transformer. Accordingly, a minute space is formed between the fly-wheel 42 and a fixed coil mounting part 44 of the rotary transformer mounted to the fixed lower drum 12.

The rotary heads 15a and 15b are respectively fixed to arcuate yokes 46a and 46b made of ferromagnetic material, respectively through head brackets 45a and 45b made of non-magnetic material, in positions opposing the yokes 46a and 46b in a 180 degree angle. The cross-section of the yokes 46a and 46b are U-shaped, and respectively have permanent magnets 47a and 47b mounted therein. The yokes 46a and 46b are constructed so that deteriorated effects are not introduced in the rotary heads 15a and 15b, due to the magnetic flux of the permanent magnets 47a and 47b. Moreover, the yokes 46a and 46b are integrally formed with ferromagnetic plates 48b and 48c which unitarily have an opening 48a at their central part, and constitute a swinging member 48 of the form shown in FIG. 4C. The opening 48a of the swinging member 48 is rotatably mounted on the rotary shaft 40 together with a central hole of a support member 49, and also fixed unitarily with respect to the bushing 41 through the support member 49. Furthermore, the swinging member 48 rotates in a so-called see-saw movement in the up-and-down direction of FIG. 4B or in the vertical direction with respect to FIG. 4A, having fulcrum projection members 51a and 51b of a fulcrum member 51 which has its center hole fixedly inserted to the projected part of the bushing 41, as the fulcrum. That is, when the rotary head 15a undergoes displacement by a certain amount in the upper (or lower) direction in FIG. 4B, the rotary head 15b undergoes displacement by the same amount as above, in the lower (or upper) direction.

The above rotation of the swinging member 48 indicates the direction of inclination and the amount of inclination according to the size and polarity of the driving current, due to the magnetic force which conforms to the known Fleming's left-hand-rule, generated by the interaction between the driving current passed through a driving coil 52 which is wound around a cylindrical coil winding core inserted within the space in the U-shaped cross-sectional area of the yokes 46a and 46b as shown in FIG. 4B, and the magnetic field due to the permanent magnets 47a and 47b. This rotation of the swinging member 48 is also performed when the swinging member 48 is unitarily rotating with the rotary upper drum 11.

By this rotational displacement of the swinging member 48, in which the swinging member 48 is unitarily rotated with the rotary upper drum 11, and rotationally displaced by having the fulcrum projections 51a and 51b of the fulcrum member 51 as the fulcrum on a plane which is perpendicular to the rotating plane of the rotary upper drum 11 by the tracking control voltage supplied from the above output terminal 33, the rotary heads 15a and 15b are controlled so that their respective height positions become equal.

A rotary member 53 is fixed to the rotary shaft 40, and magnets 54a and 54b are respectively embedded in the rotary member 53 in positions opposing each other along the diametral direction of the rotary member 53. As the rotary member 53 rotates unitarily with the rotary upper drum 11, a drum pulse is obtained from a pickup head 55 every time the magnets 54a and 54b pass the position opposing the pickup head 55. This drum pulse thus obtained from the pickup head 55 is supplied to the above terminal 22.

Figure 5:
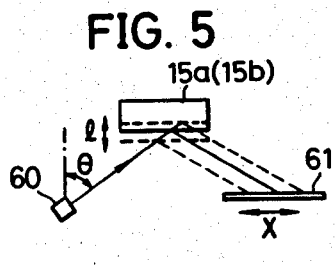
FIG. 5 is a front view showing a first embodiment of a head height position detector used in the apparatus of the present invention.
Figure 6:
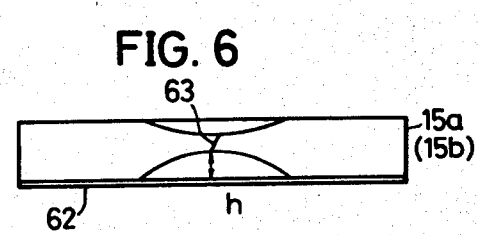
FIG. 6 is a front view showing an example of a rotary head.

Next, each embodiment of the rotary head height position detector 17 will be described. In the embodiment shown in FIG. 5, a beam spot is emitted from a light source 60 towards the bottom surface of the rotary head 15a (15b). As shown in FIG. 6, the bottom surface of the rotary head 15a (15b) is formed with a mirror-like surface which is further applied with an aluminum film 62, in order to improve the light reflectivity. The beam emitted from the light source 60 which is reflected by the rotary head 15a (15b), is received by a light receiving part 61.

If the angle formed between the direction of the beam and the line perpendicular to the reflecting surface of the rotary head 15a (15b) is designated by $\theta$, and the rotary head 15a (15b) moves up and down by a distance l, for example, the position the beam hits the light receiving part 61 varies by a distance $2l \tan \theta$ in the direction of the arrow X. When the angle $\theta$ is set at a value larger than 26.6 degrees, the distance $2l \tan \theta$ becomes larger than the moving distance l of the rotary head 15a (15b), and thus, the up and down movement of the rotary head 15a (15b) can be detected as the enlarged moving distance. Furthermore, since a distance h from the bottom surface of the head 15a (15b) is constant, the height position of a gap 63 in the rotary head 15a (15b) can be detected by detecting the height position of the bottom surface of the rotary head 15a (15b).

Figure 7:
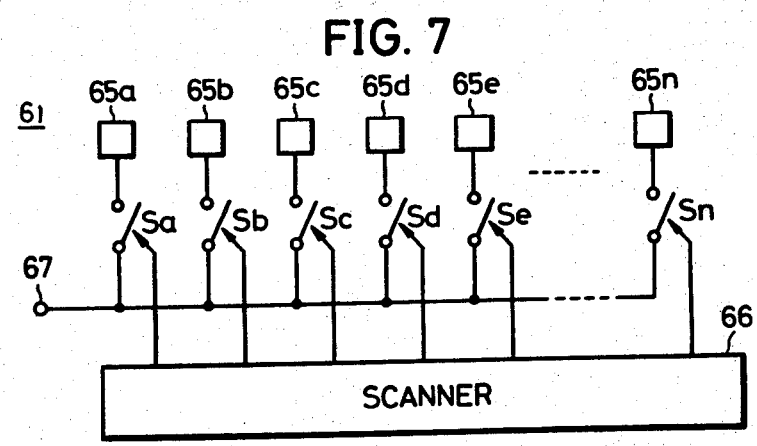
FIG. 7 is a circuit diagram showing an example of a light receiving part in the detector of FIG. 5.

A semi-conductor image sensor shown in FIG. 7 can be used as the light receiving part 61, for example, as long as it can detect the movement of the light receiving point. The light receiving part 61 comprises, for example, n number of light-sensitive converting elements 65a through 65n arranged in one line at an interval of one micron-meters. Switches Sa through Sn which are respectively connected to light-sensitive converting elements 65a through 65n, are successively closed time-divisionally by a scanner 66. The scanning performed by the scanner 66 is started immediately after the rotary head 15a (15b) passes above the detector 17.

Figure 8:
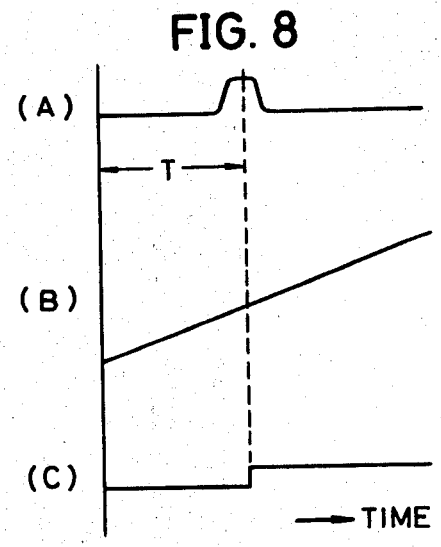
FIGS. 8(A) through 8(C) respectively are graphs showing the output of the light receiving portion of FIG. 7 and for explaining the process to obtain a detection output therefrom.

The output from a light-sensitive converting element which receives light by the scanning performed by the scanner 66 and stores the electric charge, is obtained from an output terminal 67 as shown in FIG. 8(A). By measuring a time T from the start of the scanning to when the output is obtained, it can be detected, from which light-sensitive converting element the output was obtained, that is, at which position the reflected beam reflected by the rotary head was received.

The output shown in FIG. 8(A) which is from the output terminal 67, samples a saw-tooth wave shown in FIG. 8(B) which is synchronized and rises upon starting of the scanning by the scanner 66, at a circuit (not shown) provided at the next stage. Accordingly, a D.C. voltage shown in FIG. 8(C) can be obtained. The level of this D.C. voltage, as a result, corresponds to the height position of the rotary head 15a (15b), and is transmitted as an output of the detector 17.

Figure 9:
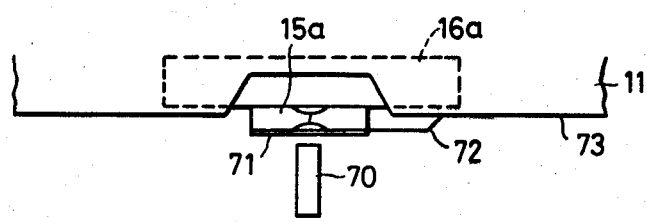
FIG. 9 is a front view showing a second embodiment of a head height position detector.

FIG. 9 shows another embodiment of the height position detector 17. A conductive film 71 comprising a vaporously adhered aluminum film, is formed at the bottom surface of the rotary head 15a (15b). The conductive film 71 is connected through a lead line 72 to the rotary upper drum 11 which is grounded. A fixed electrode 70 is mounted to the fixed lower drum 12 so that the upper end of the fixed electrode 70 forms a slight gap between the conductive film 71 of the rotary head 15a (15b).

Figure 10:
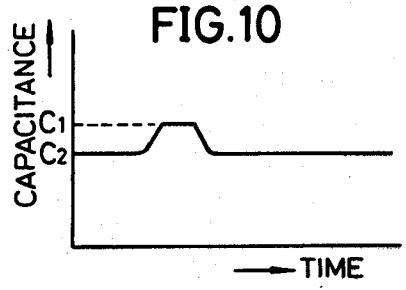
FIG. 10 is a graph showing the output of the detector of FIG. 9.

Capacitances C1 and C2 are respectively formed between the fixed electrode 70 and the conductive film 71 at the bottom surface of the rotary head 15a (15b), and between the fixed electrode 70 and a bottom surface 73 of the rotary upper drum 11. Since the gap formed between the fixed electrode 70 and the conductive film 71 is smaller than the gap formed between the fixed electrode 70 and the bottom surface 73 of the rotary upper drum 11, the relationship between the above capacitances is $C1 > C2$. Hence, accompanied by the rotation of the rotary upper drum 11, a variance in the capacitance is obtained as shown in FIG. 10. the value of the capacitance C1 corresponds to the gap formed between the conductive film 71 and the fixed electrode 70, which corresponds to the height position of the rotary head 15a (15b). Accordingly, the height position of the rotary head can be detected by detecting the above variance in the capacitance.

Figure 11:
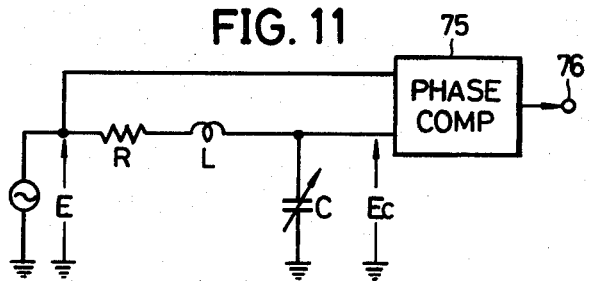
FIG. 11 is a circuit diagram showing an embodiment of a circuit system in the detector of FIG. 9.

An example of the above detecting circuit is shown in FIG. 11. A capacitor C corresponds to the above capacitance, and forms a series resonance circuit together with a resistor R and a coil L. A high-frequency voltage E is applied to this series resonance circuit. The frequency of the high-frequency voltage E is selected at a frequency equal to or close to the resonance frequency of the above series resonance circuit. The high-frequency voltage E is applied to a phase comparator 75 wherein the voltage thus applied is phase-compared with a terminal voltage Ec of the capacitor C. The output of the phase comparator 75 is transmitted as the output of the detector 17, from an output terminal 76.

The phase difference between the high-frequency voltage E and the capacitor terminal voltage Ec varies according to the variance in the capacitance of the capacitor C, and thus, the output phase error voltage of the phase comparator 75 varies according to the variance in the capacitance of the capacitor C. Hence, the phase error voltage obtained when the capacitance of the capacitor C becomes maximum, is used as the height position detected voltage of the rotary head 15a (15b).

Figure 12:
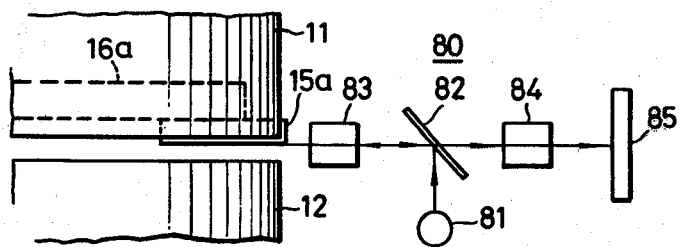
FIG. 12 is a side view showing a third embodiment of a head height position detector.

Still another embodiment of a height position detector is shown in FIG. 12. A height position detector 81 of the present embodiment is provided outside the lower guide drum 12. The beam from a light source 81 is reflected at a half mirror 82, and is transmitted to the front surface lower part of the rotary head 15a (15b) after being focused by a lens 83. The beam which is reflected by the front surface of the rotary head is sent to a light receiving part 85 through the lens 83, the half mirror 82, and a lens 84. The light receiving part 85 comprises, for example, a semi-conductor image sensor similar to that shown in FIG. 7.

Accompanied by the rotation of the rotary upper drum 11, a reflected beam is emitted towards the light receiving part 85 every time the rotary head 15a (15b) passes the front surface of the lens 83. Furthermore, the range in which the beam hits each light-sensitive converting element of the image sensor in the light receiving part 85 varies, with respect to the variance in the height position of the rotary head 15a (15b). Accordingly, the height position of the rotary head can be detected by detecting the range in which the beam is incident to each of the light-sensitive converting elements.

Further, this invention is not limited to these embodiments but various variations and modifications may be made without departing from the scope of the invention.

What is claimed is:

1. A magnetic recording and/or reproducing apparatus having a tracking control device for performing tracking control by varying the height position of a rotary head which makes contact with a magnetic tape over a predetermined angular portion of its rotating range to record and/or reproduce signals in oblique tracks on the magnetic tape and is out of contact with the magnetic tape over the remaining portion of its rotating range, according to a control signal applied to said tracking control device, said magnetic recording and/or reproducing apparatus comprising:

detecting means mounted in stationary relation with respect to the rotary head, for detecting the height position of said rotary head at a predetermined location where said rotary head is out of contact with said magnetic tape; and control signal forming means for forming a control signal according to the output of said detecting means and supplying said control signal to said tracking control device to control the height position of said rotary head so that the height position becomes constant.

2. A magnetic recording and/or reproducing apparatus as claimed in claim 1 in which said control signal forming means comprises means for forming a voltage level according to the output of said detecting means, means for supplying a reference voltage, comparing means for comparing said voltage level formed with the level of said reference voltage supplied thereto, and means for supplying the output of said comparing means to tracking control device as a control signal.

3. A magnetic recording and/or reproducing apparatus as claimed in claim 1 which further comprises drum pulse generating means for generating a drum pulse according to the rotation of said rotary heads, and in which said rotary head comprises a pair of rotary heads;

said tracking control device has first and second height position control means for respectively and separately controlling the height positions of said pair of rotary heads; and said control signal forming means comprises a switching circuit for separating the detected output of said detecting means by said drum pulse, into detected outputs obtained corresponding to each rotary head, a first and second sample-and-hold circuits for respectively sampling and holding said separated detected outputs, a circuit for supplying a reference voltage, and first and second comparing circuits for respectively comparing the outputs of said first and second sample-and-hold circuits with said reference voltage, said first and second comparing circuits respectively supplying their outputs to said first and second height position control means.

4. A magnetic recording and/or reproducing apparatus as claimed in claim 1 which further comprises means for generating a drum pulse according to the rotation of said rotary head, and in which said rotary head comprises a pair of rotary heads;

said tracking control means has a swinging body having magnetic heads provided on both ends thereof, means for supporting said swinging body so that said swinging body can undergo see-saw operation, and driving means for swinging said swinging body in a see-saw manner according to the A.C. error signal component of the signal supplied thereto, and said control signal forming means comprises a switching circuit for separating the detected output of said detecting means by said drum pulse, into detected outputs obtained corresponding to each rotary head, first and second sample-and-hold circuits for respectively sampling and holding said separated detected outputs, and a comparing circuit for comparing the outputs of said first and second sample-and-hold circuits, said comparing circuit supplying its output to said driving means of said tracking control device.

5. A magnetic recording and/or reproducing apparatus as claimed in claim 1 in which said detecting means comprises a light source for emitting a light beam towards said rotary head, a light receiving part for receiving the beam reflected by said rotary head, and means for obtaining a signal corresponding to the light receiving position of said light receiving part, indicative of the height position of said rotary head.

6. An apparatus as described in claim 5 in which said detecting means is provided on a fixed drum which forms a pair with a rotary drum on which said rotary head is provided, said light source emits the beam towards the bottom surface of said rotary head, and said light receiving part receives the reflected beam reflected by the bottom surface of said rotary head.

7. An apparatus as described in claim 5 in which said detecting means is provided outside a rotary drum on which said rotary head is provided and a fixed drum which forms a pair with said rotary drum, said light source emits the beam towards the front surface of said rotary head, and said light receiving part receives the reflected beam reflected by said rotary head.

8. A magnetic recording and/or reproducing apparatus as claimed in claim 1 in which said detecting means comprises a fixed electrode for forming a capacitance between said rotary head, said capacitance varying according to the gap between said rotary head and said fixed electrode indicative of the height position of said rotary head, a series resonance circuit including said capacitance, means for supplying a high-frequency voltage, and a phase comparator for phase-comparing said high-frequency voltage with the terminal voltage of said capacitance and transmitting the error output thus obtained as said detected output.

9. A magnetic recording and/or reproducing apparatus as claimed in claim 1 comprising means for operating said detecting means and control signal forming means during recording and reproducing to achieve tracking control during recording and reproducing.

* * * * *